(12) United States Patent
Bruno et al.

(10) Patent No.: US 6,614,765 B1
(45) Date of Patent: Sep. 2, 2003

(54) METHODS AND SYSTEMS FOR DYNAMICALLY MANAGING THE ROUTING OF INFORMATION OVER AN INTEGRATED GLOBAL COMMUNICATION NETWORK

(75) Inventors: Richard Frank Bruno, Morristown, NJ (US); Howard Paul Katseff, Englishtown, NJ (US); Robert Edward Markowitz, Glen Rock, NJ (US); Bethany Scott Robinson, Lebanon, NJ (US); Kenneth H. Rosen, Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/946,175

(22) Filed: Oct. 7, 1997

(51) Int. Cl.[7] ............... G01R 31/08; G06F 11/00; G08C 15/00; H04J 1/16; H04J 3/14; H04L 1/00; H04L 12/26; H04L 12/28; H04L 12/56

(52) U.S. Cl. ............... 370/255; 370/410; 370/524

(58) Field of Search ............... 370/351, 389, 370/400, 254, 255, 238, 229, 235, 401, 410, 522–524; 709/238, 241

(56) References Cited

U.S. PATENT DOCUMENTS

| | | | |
|---|---|---|---|
| 5,461,611 A | | 10/1995 | Drake, Jr. et al. ........... 370/420 |
| 5,623,481 A | * | 4/1997 | Russ et al. .................... 370/225 |
| 5,805,072 A | * | 9/1998 | Kakemizu .................... 370/351 |
| 5,822,301 A | * | 10/1998 | Arnold et al. ............... 370/238 |
| 5,828,844 A | * | 10/1998 | Civanlar et al. ............. 370/400 |
| 5,838,660 A | * | 11/1998 | Croslin ........................ 370/216 |
| 5,909,440 A | * | 6/1999 | Ferguson et al. ............ 370/389 |
| 5,940,491 A | * | 8/1999 | Anderson et al. ............ 370/351 |
| 5,953,338 A | * | 9/1999 | Ma et al. ..................... 370/400 |
| 5,970,232 A | * | 10/1999 | Passint et al. ............... 370/351 |
| 5,995,503 A | * | 11/1999 | Crawley et al. ............. 370/351 |
| 2002/0165957 A1 | * | 11/2002 | Devoe et al. ................ 709/224 |

FOREIGN PATENT DOCUMENTS

EP     0777362 A1     6/1997

OTHER PUBLICATIONS

European Search Report dated Nov. 16, 2000.
Saunders, S. "Route Server Spells End To Table Service" vol. 24 (1995), pp. 39–40.
Rexford J. et al.: "A Router Architecture For Real–time Point–To–Point Networks" Proceeding of ISCA '96: The 23rd Annual International Conference On Computer Architecture, Philadelphia, PA May, 22–24, 1996, pp. 237–246.
White, P.P.: "RSVP and Integrated Services In The Internet: A Tutorial" IEEE Communiation Magazine, vol. 35, No. 5, May 1997, p. 100–106.

* cited by examiner

Primary Examiner—Seema S. Rao
Assistant Examiner—Kevin C. Harper (57) ABSTRACT

Methods and systems for routing information in an integrated global communications network comprising a signalling system interconnecting a source router, a plurality of intermediate routers, a destination router and a routing processor for routing the multimedia information. The source router receives the information including the routing requirements associated with the information and transmits a routing query signal to the routing processor. The routing processor evaluates the routing requirements, determines which routers and communication paths are capable and available to route the information, evaluates the statistical availability of such routers and selects an optimal routing path comprising select ones of the available routers and communication paths.

47 Claims, 3 Drawing Sheets

METHODS AND SYSTEMS FOR DYNAMICALLY MANAGING THE ROUTING OF INFORMATION OVER AN INTEGRATED GLOBAL COMMUNICATION NETWORK

FIELD OF THE INVENTION

The present invention relates generally to the field of managing the routing of information over an integrated global communication network, such as the Internet, and, more particularly, to the methods and systems for reserving routing paths for routing information over the network.

BACKGROUND OF THE INVENTION

As is well known, the Internet is a vast collection of computers that communicate over a packet network via high-speed communication paths ranging from ISDN to T1, T3, FDDI, SONET, SMDS, OT1, etc. A personal computer typically accesses the Internet through a modem on a user's "Plain Old Telephone Service" (POTS) line or through a switched ISDN. Alternatively, a personal computer can access the Internet through a X.25, Frame Relay (FR) or Asynchronous Transfer Mode (ATM) connection on a high-speed local area network (LAN) or wide area network (WAN). Connecting a personnel computer to the LAN requires a card known as a LAN adapter that plugs into the computer's expansion bus. Once Internet access is established, the Internet communicates information from the source computer to a destination over a routing path using any one of a number of protocols, such as the Internet Protocol (IP).

With the increased routing of multimedia (voice, video and data) calls over the Internet, there continues to be a growing demand for modifications to the routing component of the Internet infrastructure to support real-time quality transmission of information. For example, video applications have characteristics including file size, flow rate and sensitivity to delay that distinguish them from other applications that share the same network. A single video file can be hundreds of megabytes or gigabytes long, whereas traditional data is significantly shorter. Further, a traditional data application is sent over a network as a burst of packets, whereas a video application is sent as a continuous stream of data which must be delivered quickly and regularly. When packetized, transmission delays must not vary by more than a few milliseconds. Data that arrives too late is discarded resulting in diminished quality of display. Moreover, the frames occupy space in queues, delaying the rest of the traffic and possibly causing such traffic to be discarded as well. Thus, the key requirement is to reduce the end-to-end packet delays (e.g. jitter) in order to satisfy real-time delivery constraints and achieve the necessary high nodal throughput (e.g. message latency) for the transfer of real-time voice and video.

Currently, the management of routing between the Internet and the various routers are commonly performed over a signalling network, such as Resource Reservation Protocol (RSVP), which visits routers in the network and attempts to make a resource reservation to obtain routes that are capable of routing particular multimedia information. A more detailed description of RSVP may be found in R. Braden et al., *Resource ReServation Protocol (RSVP)—Version 1 Functional Specification*,Internet Draft,June 1997, ftp://ftp.isi.edu/internet-drafts/draft-ietf-rsvp-spec-16.txt, which is incorporated herein by reference.

The current Internet routing structure, however, lacks the ability to provide advanced reservation of optimal routing paths for such real-time multimedia information. Such advanced reservation is desirable in reducing jitter and achieving high message latency in the transmission of such information. It is therefore desirable to improve the routing of multimedia information through the integrated global communication network such that the desired transmission is achieved.

SUMMARY OF THE INVENTION

In one aspect, the invention features a system for managing the routing of information to a destination through a packet network that includes a plurality of routers, wherein each router in the packet network is linked to at least one other router by a communication medium. The system comprises a routing processor for receiving a routing query specifying a destination to which the information will be routed and a memory for storing at least one characteristic of each of the routers in the packet network. The processor determines a route for the transmission of the information based on the routing query and on the characteristics stored in the memory, wherein the route comprises at least two of the routers.

In another aspect of the invention, the invention features a system for routing information to a destination, which comprises a packet network and a routing processor. The packet network includes a plurality of routers, wherein each router is linked to at least one other router by a communication medium. The routing processor receives a routing query signal from a first one of the routers and information concerning at least one characteristic of each of the remaining routers. The routing processor then determines a transmission path for routing the information through the packet network based on the routing query and on the characteristics stored in the memory, wherein the route comprises at least two of the routers.

In still another aspect of the invention, the invention features a method for managing the routing of information to a destination through a packet network, wherein the network includes a plurality of routers and each router is linked to at least one other router by a communication medium. The method comprises the steps of receiving a routing query specifying a destination to which the information will be routed at a routing processor, storing at least one characteristic of each of the routers in a memory and determining a route for the transmission of the information based on the routing query and on the stored characteristics. The transmission path comprises at least one router in addition to the first router.

In yet another aspect of the invention, the invention features a method for managing the routing of information to a destination in a packet network that includes a plurality of routers, wherein each router is linked to at least one other router by a communication medium. The method comprises the steps of receiving a routing query signal from a first one of the routers and information concerning at least one characteristic of each of the remaining routers and determining a transmission path for routing the information through the packet network. The transmission path comprises at least one router in addition to the first router. Such routing can be implemented for both Internet and Intranet traffic.

DESCRIPTION OF THE PREFERRED EMBODIMENTS

Figure 1:
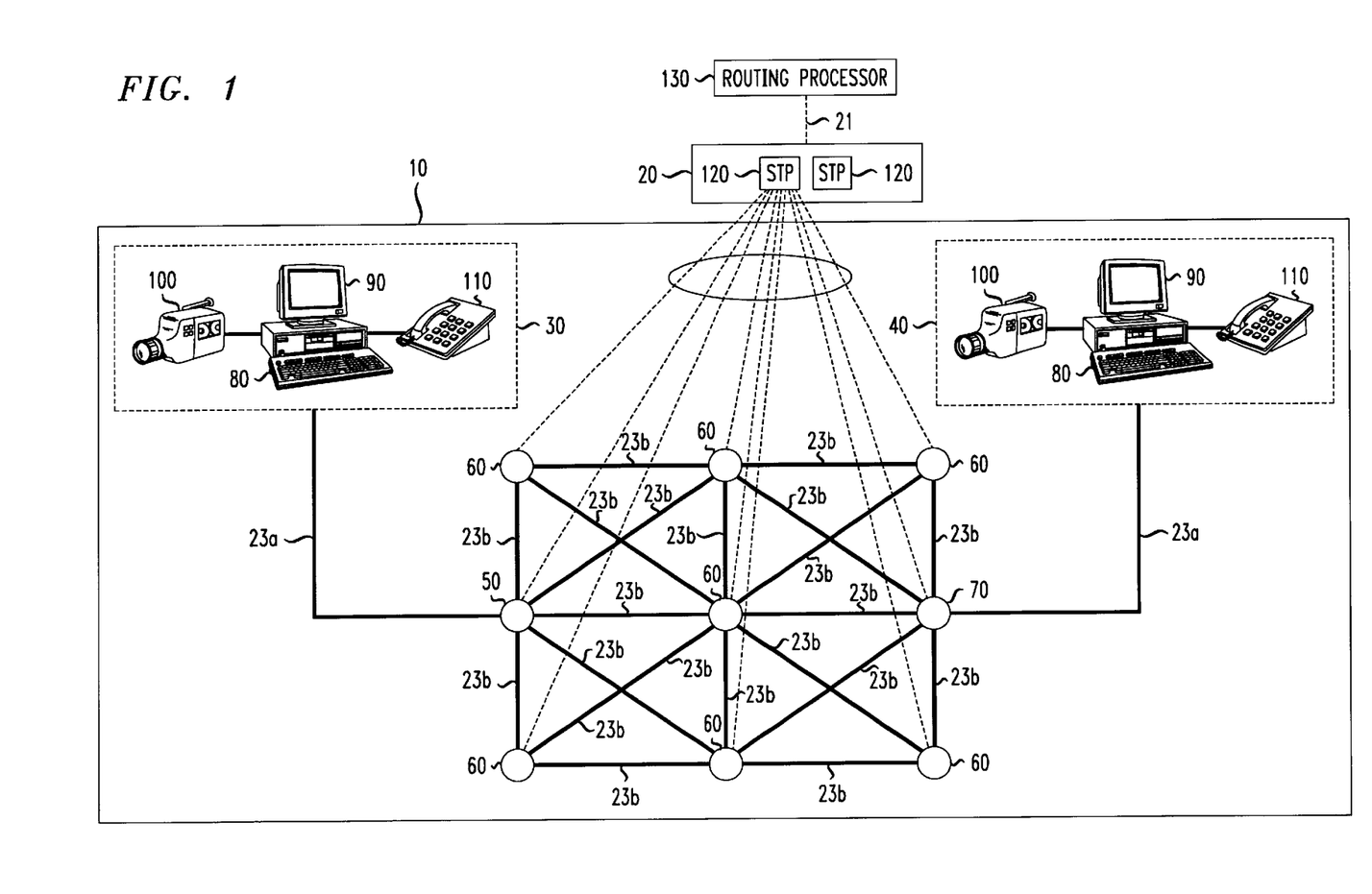
FIG. 1 is a block diagram illustrating a system for managing the routing of information over an integrated global communication network in accordance with one embodiment of the present invention.

FIG. 1 shows a simplified integrated global data communication network suitable for use in accordance with an embodiment of the present invention. It will of course be recognized that the network of FIG. 1 includes other known elements, but those elements have been omitted for simplicity.

Referring to FIG. 1, there is illustrated an integrated global communication network 10, such as the Internet, that uses a signalling system 20 for communicating messages. The network 10 includes plural multimedia terminals 30 and 40, communication paths 23a and 23b, a source router 50, a plurality of intermediate routers 60 and a destination router 70. Of course, an actual network could include many more such terminals, paths and routers.

As shown, multimedia terminals 30 and 40 each include a processing unit 80, a CRT 90, and a camera 100. The terminals 30 and 40 are used merely as an example and may include a variety of other communication devices, including but not limited to an associated telephone 110 located external to each of the processing units 80 for purposes of dialing another terminal's telephone number when the processing units 80 are incapable of doing so directly. Because of the numerous types of multimedia capable devices which may be utilized in connection with the invention, the integrated global communication network 10 may also include additional processing equipment (not shown) at the destination, for example, a cable converter, satellite transmission converter or personal computer may be necessary to convert a message to a format compatible with that destination. A more detailed general background on multimedia communication, and particularly, desktop videoconferencing and collaborative video equipment may be found in Don Labriola, *Meeting on the Edge*, Windows Sources, September 1994, p. 96 et seq.

Each of the processing units 80 may be a general purpose computer with multimedia capable equipment and/or packetized voice hardware and/or software incorporated therein. A more detailed description of the construction and operation of the Vistium video system may be found in Andrew W. Davis, *VISTIUM: AT&T's Board-Level Videoconferencing at the Desktop*, Advanced Imaging, Sep. 1994, p. 46 et seq., which is incorporated herein by reference. Alternatively, the processing unit may be any multimedia specific device.

The signalling system 20 interconnects the various components of the network 10, including source router 50, intermediate routers 60, and destination router 70 to routing processor 130. Preferably, the signalling system 20 used by the network is an SS7 network of interconnected STPs 120. As is well known, the SS7 network utilizes a SS7 protocol which consists of four basic sub-protocols. These sub-protocols are: message transfer part (MTP) which provides the function of basic routing of signaling messages between signaling points; a signaling connection control part (SCCP) which provides additional routing and management functions for transfer of messages other than call set-up between the signaling points; an integrated services digital network (ISDN) user part (ISUP) which transfers call set-up signaling information between signaling points; and a transaction capabilities part (TCAP) which transfers non-circuit related information between the signaling points.

The signalling system 20 illustrated in FIG. 1 includes the preferred SS7 network of interconnected STPs 120. Those skilled in the art will recognize that STP 120 is a multi-port, high speed packet switch that directs traffic among entities on a network. It should be noted that signal transfer point devices such as STP 120 are conventionally installed in redundant pairs within a network, as illustrated, so that if one device fails, its mate takes over until the first STP 120 is able to return to service.

As is illustrated in FIG. 1, STP 120 is connected to routing processor 130 by communication path 21 and the source router 50, the intermediate routers 60, and the destination router 70 are connected to STP 120 by communication path 22. It should be noted that separate paths are provided for communication paths 21 and 22, that communicate routing message signals, and communication paths 23a and 23b, that actually communicate the information. Communication paths 21 and 22 are preferably high digital serial A-links, which transfer routing message signals between elements 50, 60, 70, 120, and 130 using out-of-band signaling with other communications protocols. It is understood that communication paths 21 and 22 are logical paths, although the communication paths could be physical paths.

After the signalling system 20 completes sending the routing message signals via STP 120 through communication paths 21 and 22, communication paths 23a and 23b transfer the multimedia information from terminal 30 to terminal 40 through a routing path including source router 50, select intermediate routers 60, and destination router 70 over communication paths 23a and select communication paths 23b. In most instances, the multimedia information will be routed from multimedia terminal 30 to source router 50 and destination router 70 to terminal 40, through communication paths 23a via an LEC (not shown) in a public switched network or via a private switched network (not shown) and through intermediate routers 60 via communication paths 23b. Communication paths 23a and 23b comprise digital links, which are preferably high speed (1.544 Mbps) T-1 span over which information is transmitted using in-band-signaling in a serial fashion. Other known communication paths, besides the preferred T-1 links, which are also suitable for use in conjunction with this invention include, for example, Feature Group D Data Trunks (sometimes referred to as "FG-D"), as well as ATM, FR, ISDN BRI, ISDN PRI, T1, Switched 56 (SW56), 45 Kbps DS-3/Datapath, 56 Kbps DDS/Datapath, or nxDS-0 paths.

It will be recognized that the types and combinations of communication paths 23a and 23b which may be employed are too numerous to discuss in detail. It should therefore be recognized that the preferred embodiment will work with communication paths 23a and 23b that are capable of supporting packetized voice and/or a combination of single or multi-channel video, audio or data requiring different sizes of bandwidth. By way of example, where the path is an ISDN path it should support about 64 Kbps access for combinations of single channel video, audio and data or about 128 Kbps access for combinations of two channel video, audio and data. Where the path is T1 it should support about 1.5 Mbps access for combinations of single channel video, audio and data or about 3 Mbps access for combinations of two channel video, audio and data. Where the path is switched 56 it should support about 56 Kbps access for combinations of single channel video, audio and data or about 112 Kbps access for combinations of two channel video, audio and data. Where the path is DS-3 it should support about 45 Kbps access for combinations of single channel video, audio and data or about 90 Kbps access for combinations of two channel video, audio and data. Where the path is nxDS-0, the path should support n×64 Kbps access, where n is the number of channels.

In the embodiment illustrated in FIG. 1, the source router 50, intermediate routers 60, and destination router 70 could be any number of conventional routers capable of routing information over the network 10 and processing signalling messages over signalling system 20. Similarly, the routing processor 130 is illustratively shown as and may be implemented using a 2NCP processor also available from Lucent Technologies Inc., but could otherwise be any processing means capable of processing signalling messages communicated over the signalling system 20. The routing processor 130 is utilized to control routing of multimedia (i.e, real-time video or audio) information associated with a network subscriber.

While only a specific number of intermediate routers 60, STPs 120 and routing processor 130 are illustrated in FIG. 1, it is understood that the communication network 10 may include additional routers, STPs and/or routing processors to process and complete such multimedia information over the network 10. It is also understood that various trunks and other channels may be provided in the network 10 to connect, for instance, two or more routers to one another. It is further understood that various modifications may be made to the network 10 without departing from the scope of the invention.

Figure 2:
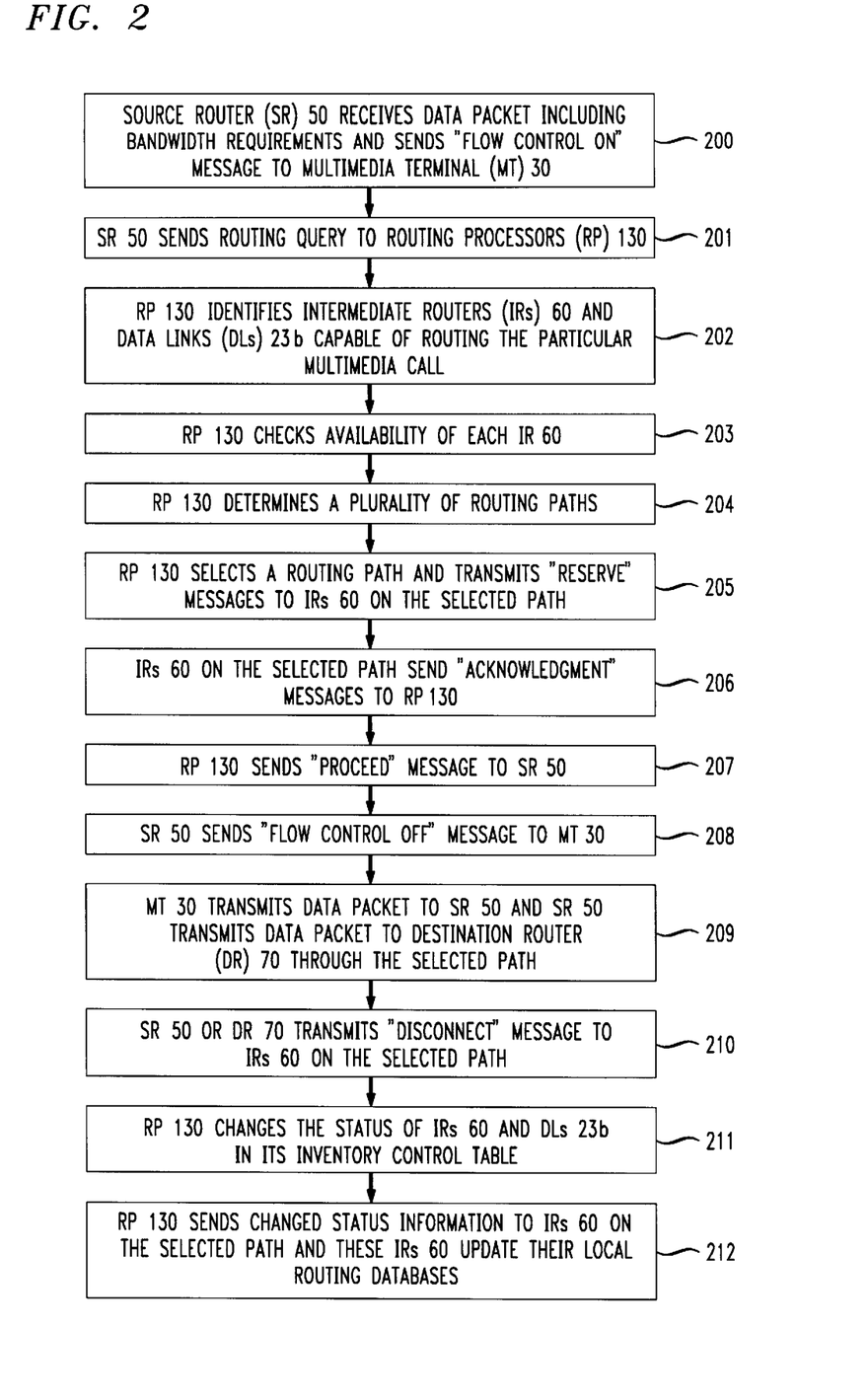
FIG. 2 is a functional block diagram of a method for managing the routing of information over an integrated global communication network using the system of FIG. 1.

Referring to FIG. 2, there is illustrated a block flowchart of the preferred method of using the system illustrated in FIG. 1, in which routing processor 130 controls the routing of multimedia information from multimedia terminal 30 to multimedia terminal 40 in network 10.

In step 200, source router 50 begins receiving a plurality of information packets that form a multimedia session from multimedia terminal 30. Preferably, the packets are sent to source router 50 using Internet IP addressing and UDP protocol. Upon receiving the first packets, which include the source and destination addresses and routing requirement information (e.g. bandwidth and time limitations on information transfer), the source router 50 sends a flow control ON message to the multimedia terminal 30 to hold further transmission of the remaining information packets that form the session. As is known in the art, upon receiving the packet, the source router 50 translates the destination network address to a physical address in the Internet network.

In step 201, the source router 50 sends a routing query to the service processor 130 via STP 120. The routing query includes the source and destination addresses as well as routing requirements (e.g. bandwidth requirements). The routing query is preferably a routing TCAP query message.

In step 202, the routing processor 130 evaluates the list of intermediate routers 60 and corresponding communication paths 23b, in Router Table 140 and Inventory Control Table 150, and identifies intermediate routers 60 (including any backup or secondary intermediate routers) and communication paths 23b connected therebetween that have the appropriate bandwidth capability to route particular multimedia information.

In step 203, the routing processor 130 identifies each intermediate router 60 in the list of intermediate routers 60 and corresponding communication paths 23b, previously identified by the routing processor 130 in step 202, that is capable of processing the information to determine which routers are currently available.

Specifically, in step 203, the routing processor 130 uses a pointer in a list of intermediate routers identified by the routing processor 130 to consider each router. The routing processor 130 determines whether the router, on the list to which the pointer is directed, is available. The routing processor 130 will then point to the "next" router in the list and repeat the process until the routing processor 130 has checked all of the routers in the list to ascertain their respective availability conditions. Once all of the routers in the list have been considered and the pointer is incremented back to the first router then the routing processor 130 proceeds to step 204.

If the routing processor 130 determines in step 203 that all or some of the intermediate routers 60 in the list of routers 60 capable of routing particular multimedia information are available, then the routing processor 130 provides such router 60 and communication path 23b information to its optimal route program 160 for determining the optimal routing path of intermediate routers 60 and communication paths 23b between the source router 50 and the destination router 70 and its statistical program 170 for determining the frequency of use of such intermediate routers 60 (step 204).

Figure 3:
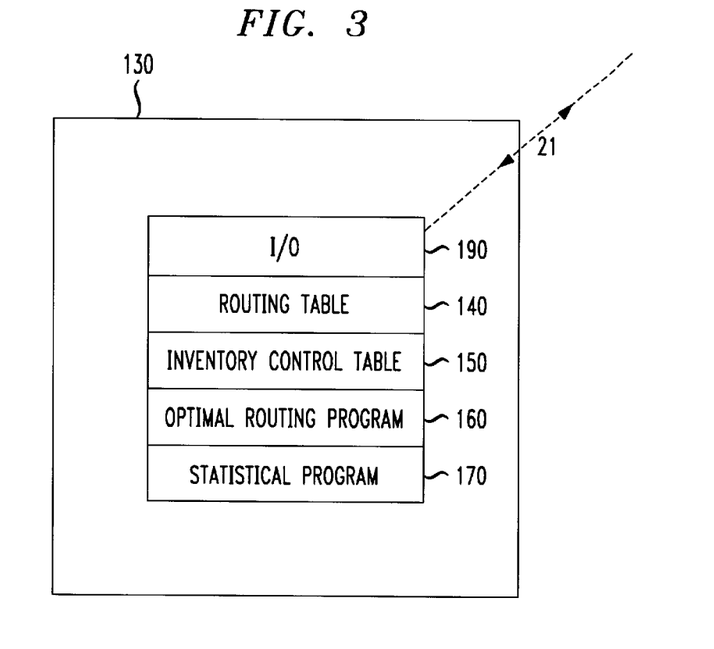
FIG. 3 is a block diagram illustrating an embodiment of the routing processor of FIG. 1.

The optimal routing program 160, discussed in more detail below in the description of FIG. 3, provides intelligence or decision making capabilities based upon stored programs and data which is available either in the 140 or Inventory Control Table 150 (see FIG. 3) or obtained from other data sources such as local dynamic routing databases 225 in individual routers 60 to calculate the optimal route. The optimal routing program 160 may for example be the Real-Time Network Routing (RTNR) program described in Ash et al. U.S. Pat. No. 5,101,451, which is incorporated herein by reference.

The statistical program 170, discussed in more detail below in the description of FIG. 3, utilizes the status information stored in the Inventory Control Table 150 to maintain a statistical record of performance of the system. The statistical program 160 and the optimal routing program 170 are both used by the routing processor 130 in determining several routing paths including an optimal routing path. (step 204).

After the routing paths are determined, the routing processor 130 selects a routing path (preferably, the optimal routing path, discussed in more detail below in the description of the optimal routing program 160 of FIG. 3) and the routing processor 130 retrieves from the Router Table 140 the SS7 network address of the desired routers 60 (step 206). The routing processor 130 also creates and transmits "Reserve" messages, preferably SS7 messages, instructing each of the intermediate routers 60 on this path to reserve a routing path including communication paths 23b with the specific bandwidth and length capabilities to provide the requested quality of service. The intermediate routers 60 then send "Acknowledgement" messages to routing processor 130 (step 206).

Routing processor 130 transmits a "Proceed" message to the source router 50 identifying the reserved router path and instructing the source router 50 to proceed to route the information within the network 10 (step 207).

Source router 50 sends a flow control OFF message to terminal 30 instructing terminal 30 to continue to transmit the remaining information packets (step 208). Terminal 30 then sends the remaining packets to source router 50 which forwards such packets to destination router 70 through intermediate router(s) 60 and communication paths 23b on the reserved router path. (step 209). In the preferred embodiment, the reserved routing path forms a permanent virtual connection, which will remain up even if the session is disconnected in error.

When terminal 40 receives all the information, either terminal 30 or terminal 40 transmit a "Disconnect" message to source router 50 or destination router 70, respectively. (step 210). Router 50 or 70 then forward this "Disconnect" message to all intermediate routers 60 on the reserved routing path, thereby disconnecting the session and ensuring that the session status is correct. (step 210).

The routing processor 130 then updates its 140 and Inventory Control Table 150 changing the status of the intermediate routers 60 and communication paths 23b in its lists from unavailable to spare. (step 211).

Preferably, the routing processor then sends this information to the reserved intermediate routers 60 which update their local dynamic routing databases 225 from unavailable to spare. (step 212).

Referring to FIG. 3, there is illustrated an embodiment of the routing processor 130 as shown in FIG. 1. The routing processor 130 includes an optimal routing program 160 and statistical program 170 each comprising a microprocessing unit (MPU) and each operating under program control as supported by a ROM, a RAM, an input keyboard, an output display monitor, and an input/output interface device which provide communication capability, i.e. transmission and reception, of information and commands to other elements of the routing processor 130 such as the 140 and Inventory Control Table 150 and routers 60 such as local dynamic database 225. The MPU is also supported by a non-volatile data storage device, such as a hard disk, which provides general storage of program controlled instructions and data which is utilized in decision making carried out by the optimal routing program 160 and statistical program 170. Each of the storage devices can be considered as storing data associated with different databases, Router Table 140 and Inventory Control Table 150. The routing processor 130 also includes an input/output module 190 which accommodates communication with the illustrated source router 50, intermediate routers 60 and destination router 70 via STPs 120.

The Router Table 140, in the illustrative embodiment is preferably stored within a database of the routing processor 130 and is utilized by the routing processor 130 to determine the SS7 network routing information associated with one or more intermediate routers 60 capable of routing the information in accordance with the present invention. The Router Table 140 illustrated in FIG. 3 preferably comprises at least three columns. For example, the first column of the Router Table 140 identifies the routers 50, 60, 70 and corresponding communication paths 23a and 23b. The second column of the Router Table 140 contains each router Internet address and corresponding SS7 network address. Various router SS7 network addresses may be utilized to reach a router 60 capable of routing the information. The third column of the Router Table 140 contains the status of each router (e.g., available). The status of the router SS7 address is determined dynamically based on its SS7 network routing status.

The Inventory Control Table 150, in the illustrative embodiment, stores logical, physical, and statistical information relating to intermediate router(s) 60 and communication paths 23b (e.g. bandwidth and distance between routers 60). For example, assuming the total bandwidth for the T-1 transport sections of intermediate router communication paths 23b is 15.44 Mbps and that the bandwidth is divided into chunks of 8 Kbps. This bandwidth segment information is placed in the Inventory Control Table 150.

The Inventory Control Table 150 also stores information relating to the availability and bandwidth consumption status of intermediate routers 60 and communication paths 23b such routers 60. One feature of the preferred embodiment is the capability of routing information based on current router availability. In order to minimize multimedia information-processing time, it is desirable to have real-time status information concerning the availability of a router to accept incoming information. As used herein, "real-time" information means information available in a short time, e.g., a few seconds, as opposed to longer delays. Such real-time information concerning each of routers 60 and communication paths 23b availability is preferably stored in the Inventory Control Table 150. Preferably, the higher speed communication paths 21 and 22 are utilized in order to provide the most current real-time status of each router 60 and communication path 23b for utilization by routing processor 130. Specifically, the stored information includes records based on time of day routing, day of week routing, location routing, bandwidth consumption routing, and alternate routing in cases of busy conditions.

The Inventory Control Table 150 preferably, also contains data which reflects the availability of each router and contains corresponding time data. For example, this database information can permit routers to be selected based upon the router that has been available for the longest time.

The optimal routing program 160, in the illustrative embodiment, preferably determines the optimum routing path required to minimize the number of routing hops involved in completing the multimedia call across the network and thus, results in reduced jitter. For example, assuming that each router introduces 50 milliseconds of delay, the optimal routing path used to transport voice over the integrated global communication network should include no more than three router hops. Further, in computing the optimal path, the optimal routing program 160 takes into consideration the bandwidth required for the call and selects routers and associated communication paths that are capable of providing the best high nodal throughput for the call. For example, assuming the call requires bandwidth of about 1.5 Mbps the optimization will consider all routers 60 and associated communication paths 23b, identified in the routing processor's 130 Routing Table 140 and Inventory Control Table 150, with this bandwidth capability and then determine the optimal path utilizing select ones of these routers 60 and associated communication paths 23b.

The statistical program 170, in the illustrative embodiment, reviews the components of the network (i.e. has a global view of the network and the routers and the corresponding communication paths included therein) stored in the routing processor's 130 Routing Table 140 and Inventory Control Table 150 and determines the percentage of time each router is available or busy. The statistical program 170 also determines the percentage of time the corresponding communication paths are available to provide the requested bandwidth. Such statistical calculations are computed at different times of days and on different days of the week and the results of such calculations are then stored in the Inventory Control Table 150.

Figure 4:
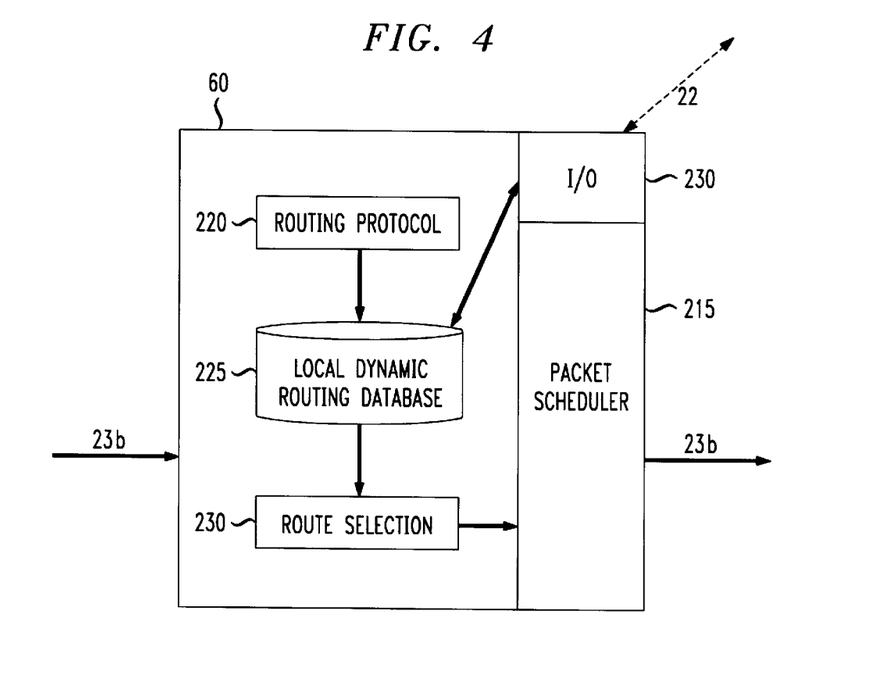
FIG. 4 is a block diagram illustrating an embodiment of the routers of FIG. 1.

Referring to FIG. 4, there is illustrated a block diagram of an embodiment of routers 50, 60, and 70 illustrated in FIG. 1. For discussion purposes, the router is marked as an intermediate router 60. Router 60 includes a packet scheduler 215 to hold information packets in a queue, a routing protocol 220 to store handling instructions and decision making processes for routing information based on the specific routing requirements, a local dynamic routing data base 225 to store individual router information including bandwidth consumption and communication path 23b information and a local route selection 230 which is used by the router in determining which communication paths 23b are capable of routing multimedia information. Router 60 routes information over communication paths, such as communication path 23b, as discussed above. These existing routers can be modified, however, to also include input/output module (I/O) 190 to accommodate communication of routing message signals between such routers and the routing processor 130 through communication paths 22 via STPs 120.

Although an illustrative preferred embodiment has been described herein in detail, it should be noted and will be appreciated by those skilled in the art that numerous variations may be made within the scope of this invention without departing from the principle of this invention and without sacrificing its chief advantages. For instance, it is understood that, while the present invention has been described above with respect to "SS7" messaging over a signalling system, other types of signalling systems may be utilized to interconnect and communicate signalling messages between the various components of the integrated global communication network. The terms and expressions have been used herein as terms of description and not terms of limitation. There is no intention to use the terms or expressions to exclude any equivalents of features shown and described or portions thereof and this invention should be defined in accordance with the claims which follow.

We claim:

1. A system for managing the routing of information to a destination through a packet network that includes a plurality of routers, each router being linked to at least one other router by a first communication medium, said system comprising:

a routing processor for receiving a routing query specifying a destination to which said information will be routed;

a memory for storing at least one characteristic of each of said routers in said packet network, said characteristic including statistical information;

wherein said processor has direct access to said characteristic of said routers and determines a route for the transmission of said information based on said routing query and on said characteristics stored in said memory, said route comprising at least two of said routers; and a second communication medium for transmitting signals from said processor to said routers, wherein the second communication medium differs from the first communication medium.

2. The system according to claim 1, wherein said characteristic includes information relating to the bandwidth of said communication medium.

3. The system according to claim 1, wherein said characteristic includes statistical information relating to the availability of each of said routers.

4. The system according to claim 3, wherein said statistical information includes information relating to the availability of each of said routers at specific times of day.

5. The system according to claim 3, wherein said statistical information includes information relating to the availability of each of said routers on specific days of the week.

6. A system for routing information to a destination, said system comprising:

a packet network that includes a plurality of routers, wherein each router is linked to at least one other router by a first communication medium;

a routing processor for receiving a routing query signal from a first one of said routers and information concerning at least one characteristic of each of said remaining routers, said characteristic including statistical information, said routing processor determining a transmission path for routing said information through said packet network, said transmission path comprising at least one router in addition to said first router;

wherein said routing processor has direct access to said characteristic of said routers and determines said transmission path based on said routing query signal and on said received characteristics; and a second communication medium for transmitting signals from said processor to said routers, wherein the second communication medium differs from the first communication medium.

7. The system according to claim 6, wherein said routing processor transmits reservation signals to each of said routers on said transmission path.

8. The system according to claim 6, wherein said characteristic includes at least one address for each of said routers.

9. The system according to claim 6, wherein said characteristic includes information relating to the bandwidth of said communication medium.

10. The system according to claim 6, wherein said characteristic includes statistical information relating to the availability of each of said router.

11. The system according to claim 10, wherein said statistical information includes information relating to the availability of each of said routers at specific times of day.

12. The system according to claim 10, wherein said statistical information includes information relating to the availability of each of said routers on specific days of the week.

13. The system according to claim 6, wherein said routing processor includes a program for calculating statistical information about each of said routers based on characteristics stored in memory.

14. A system for managing the routing of information to a destination, said system comprising:

a packet network that includes a plurality of routers, wherein each router is linked to at least one other router by a first communication medium; and a router processor in communication with said routers through a signaling system, wherein said signaling system transmits signals using a second communication medium that differs from the first communication medium;

wherein said routing processor receives a routing query signal from a first one of said routers and information concerning at least one characteristic of each of said remaining routers through said signaling system, said characteristic including statistical information, said routing processor determining a transmission path for routing said information through said packet network, said transmission path comprising at least one router in addition to said first router;

wherein said routing processor has direct access to said characteristic of said routers and determines said transmission path based on said routing query signal and on said received characteristics.

15. The system according to claim 14, wherein said routing processor transmits reservation signals to each of said routers on said transmission path.

16. The system according to claim 14, wherein said characteristic includes at least one address for each of said routers.

17. The system according to claim 14, wherein said characteristic includes information relating to the bandwidth of said communication medium.

18. The system according to claim 14, wherein said characteristic includes statistical information relating to the availability of each of said routers.

19. The system according to claim 18, wherein said statistical information includes information relating to the availability of each of said routers at specific times of day.

20. The system according to claim 18, wherein said statistical information includes information relating to the availability of each of said routers on specific days of the week.

21. The system according to claim 14, wherein said routing processor includes a program for calculating statistical information about each of said routers based on characteristics stored in memory.

22. The system according to claim 14, wherein said signalling system utilizes SS7 messaging capabilities.

23. The system according to claim 14, wherein said signalling system includes at least one signal transfer point.

24. A system for managing the routing of multimedia information to a destination, said system comprising:
   a packet network that includes a plurality of routers, wherein each router is linked to at least one other router by a first communication medium; and
   a routing processor in communication with said routers through a signaling system, wherein said signaling system transmits signals using a second communication medium that differs from the first communication medium;
   wherein said routing processor receives a routing query signal including routing requirements from a first one of said routers and information concerning at least one characteristic of each of said remaining routers through said signaling system, said characteristic including statistical information, said router processor identifies a plurality of routers that are capable of routing said information, said routing processor has direct access to said characteristic of said routers and determines a transmission path for routing said information based on said routing query and on said characteristic, through said packet network, said transmission path comprising at least one router in addition to said first router.

25. The system according to claim 24, wherein said routing processor transmits reservation signals to each of said routers on said transmission path.

26. The system according to claim 24, wherein said signalling system utilizes SS7 messaging capabilities.

27. The system according to claim 24, wherein said signalling system includes at least one signal transfer point.

28. A method for managing the routing of information to a destination through a packet network, wherein said network includes a plurality of routers, each router being linked to at least one other router by a first communication medium, said method comprising the steps of:
   receiving a routing query specifying a destination to which said information will be routed at a routing processor;
   storing at least one characteristic of each of said routers, said characteristic including statistical information, wherein said characteristic of said routers may be directly accessed by said processor;
   determining a route for the transmission of said information based on said routing query and on said stored characteristics, said route comprising at least two of the routers; and
   transmitting said route from said processor to said routers via a second communication medium, wherein the second communication medium differs from the first communication medium.

29. The method according to claim 28, wherein said step of storing characteristics includes the step of storing at least one address for each of said routers.

30. The method according to claim 28, wherein said step of storing characteristics includes the step of storing information relating to the bandwidth of said communication medium.

31. The method according to claim 28, wherein said step of storing characteristics includes the step of storing statistical information relating to the availability of each of said routers.

32. The method according to claim 31, wherein said step of storing statistical information further includes the step of storing information relating to the availability of each of said routers at specific times of day.

33. The method according to claim 31, wherein said step of storing statistical information further includes the step of storing information relating to the availability of each of said routers on specific days of the week.

34. A method for managing the routing of information to a destination a packet network that includes a plurality of routers, wherein each router is linked to at least one other router by a first communication medium, said method comprising the steps of:
   receiving a routing query signal from a first one of said routers and information concerning at least one characteristic of each of said remaining routers, said characteristic including statistical information, wherein said characteristic of said routers may be directly accessed by said processor;
   determining a transmission path for routing said information through said packet network, said transmission path comprising at least one router in addition to said first router, wherein said step of determining is based on said received routing query and on said received characteristics; and
   transmitting said transmission path from said processor to said routers via a second communication medium, wherein the second communication medium differs from the first communication medium.

35. The method according to claim 34, further including the step of transmitting reservation signals to each of said routers on said transmission path.

36. The method according to claim 34, wherein said step of determining a transmission path includes the step of evaluating the bandwidth of said communication medium.

37. The method according to claim 34, wherein said step of determining a transmission path includes the step of evaluating the availability of each of said routers.

38. The method according to claim 34, wherein the step of determining a transmission path includes the step of calculating statistical information about each of said routers based on characteristics stored in memory.

39. The method according to claim 38, wherein said step of calculating statistical information includes the step of storing evaluating the availability of each of said routers at specific times of day.

40. The method according to claim 38, wherein said step of calculating statistical information includes the step of storing evaluating the availability of each of said routers on specific days of the week.

41. A method for managing the routing of information to a destination in a packet network that includes a plurality of routers, wherein each router is linked to at least one other router by a first communication medium, said method comprising the steps of:

receiving a routing query signal including routing requirements from a first one of said routers and information concerning at least one characteristic of each of said remaining router at a routing processor over a signaling system, wherein said signaling system transmits signals using a second communication medium that differs from the first communication medium, said characteristic including statistical information, wherein said characteristic of said routers may be directly accessed by said processor;

identifying a plurality of routers that are capable of routing said information;

determining the availability of said identified routers; and determining a transmission path for routing said information through said packet network based on said routing query and on said characteristic, wherein said transmission path comprises at least one of said identified routers in addition to said first router.

42. The method according to claim 41, wherein said step of determining a transmission path includes the step of evaluating the bandwidth of said communication medium.

43. The method according to claim 41, wherein said step of determining a transmission path includes the step of evaluating the availability of each of said routers.

44. The method according to claim 41, wherein the step of determining a transmission path includes the step of calculating statistical information about each of said routers based on characteristics stored in memory.

45. The method according to claim 44, wherein said step of calculating statistical information includes the step of storing evaluating the availability of each of said routers at specific times of day.

46. The method according to claim 44, wherein said step of calculating statistical information includes the step of storing evaluating the availability of each of said routers on specific days of the week.

47. A method for managing the routing of multimedia information to a destination in a packet network that includes a plurality of routers, wherein each router is linked to at least one other router by a first communication medium, said method comprising the steps of:

receiving a routing query signal including routing requirements from a first one of said routers and information concerning at least one characteristic of each of said remaining router at a routing processor over a signaling system, wherein said signaling system transmits signals using a second communication medium that differs from the first communication medium, said characteristic including statistical information, wherein said characteristic of said routers may be directly accessed by said processor;

identifying a plurality of routers that are capable of routing said information;

determining the availability of each of said identified routers;

determining a plurality of transmission paths for routing said information through said packet network based on said routing query and on said characteristic, each of said transmission paths comprising at least one of said identified routers in addition to said fist router, wherein said step of determining each of said transmission path is based on said routing query;

selecting one of said transmission paths for routing for routing aid information through said packet network;

sending reservation signals from said routing processor to said routers on said select routing path over said signaling system;

sending a routing response signal from said routing processor to said first router over said signaling system; and routing said multimedia information over said select path.

* * * * *